United States Patent

He et al.

(10) Patent No.: US 10,427,123 B2
(45) Date of Patent: Oct. 1, 2019

(54) HYDROGEN GENERATOR

(71) Applicant: NANYANG TECHNOLOGICAL UNIVERSITY, Singapore (SG)

(72) Inventors: Hongquan He, Singapore (SG); Siew Hwa Chan, Singapore (SG); Ovi Lian Ding, Singapore (SG); Caizhi Zhang, Singapore (SG); Lan Zhang, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 16/080,305

(22) PCT Filed: Mar. 22, 2017

(86) PCT No.: PCT/SG2017/050138
§ 371 (c)(1),
(2) Date: Aug. 28, 2018

(87) PCT Pub. No.: WO2017/164812
PCT Pub. Date: Sep. 28, 2017

(65) Prior Publication Data
US 2019/0015804 A1 Jan. 17, 2019

(30) Foreign Application Priority Data
Mar. 22, 2016 (SG) .......................... 10201602242Q

(51) Int. Cl.
*B01J 8/08* (2006.01)
*B01J 7/02* (2006.01)
(Continued)

(52) U.S. Cl.
CPC ................. *B01J 7/02* (2013.01); *B01J 8/082* (2013.01); *B01J 16/005* (2013.01); *C01B 3/065* (2013.01);
(Continued)

(58) Field of Classification Search
CPC .. B01J 7/02; B01J 8/082; B01J 16/005; C01B 3/065; F17C 11/005; H01M 8/04201
(Continued)

(56) References Cited

U.S. PATENT DOCUMENTS

| 9,236,626 B2 * | 1/2016 | Rosenzweig | ........... C01B 3/065 |
| 2004/0067195 A1 | 4/2004 | Strizki et al. | |
| 2004/0202903 A1 | 10/2004 | Devos et al. | |

FOREIGN PATENT DOCUMENTS

| WO | 2005090229 A1 | 9/2005 | |
| WO | WO-2010051557 A1 * | 5/2010 | ............. C01B 3/065 |

(Continued)

OTHER PUBLICATIONS

Foreign Communication from a Related Counterpart Application, International Search Report and Written Opinion dated May 30, 2017, International Application No. PCT/SG2017/050138 filed on Mar. 22, 2017.

*Primary Examiner* — Huy Tram Nguyen

(57) ABSTRACT

A hydrogen generator includes a container having a gas outlet that is configured to contain a soluble chemical fuel that reacts with a catalyst to generate hydrogen. A control cylinder is attached to the container and comprises a piston configured to travel axially within the control cylinder, a pole attached to the piston and extending into the container, a catalyst holder provided within the container and connected to the pole, resilient means biasing the catalyst holder towards a bottom of the container, and a gas inlet port. A gas flow line is in fluid communication with the gas outlet and has a first end in fluid communication with the gas inlet port, a second end configured to feed hydrogen to a hydrogen-consuming device, and a two-way valve provided to allow fluid communication between the first and second ends of the gas flow line to be selectably established or cut off.

7 Claims, 1 Drawing Sheet

(51) Int. Cl.
  *B01J 16/00*    (2006.01)
  *C01B 3/06*     (2006.01)
  *F17C 11/00*    (2006.01)
  *H01M 8/04082*  (2016.01)
  *H01M 8/065*    (2016.01)

(52) U.S. Cl.
  CPC ....... *F17C 11/005* (2013.01); *H01M 8/04201* (2013.01); *B01J 2208/00548* (2013.01); *H01M 8/065* (2013.01)

(58) Field of Classification Search
  USPC .......................................................... 422/129
  See application file for complete search history.

(56) References Cited

FOREIGN PATENT DOCUMENTS

WO    2013166424 A1    11/2013
WO    2017164812 A1    9/2017

* cited by examiner

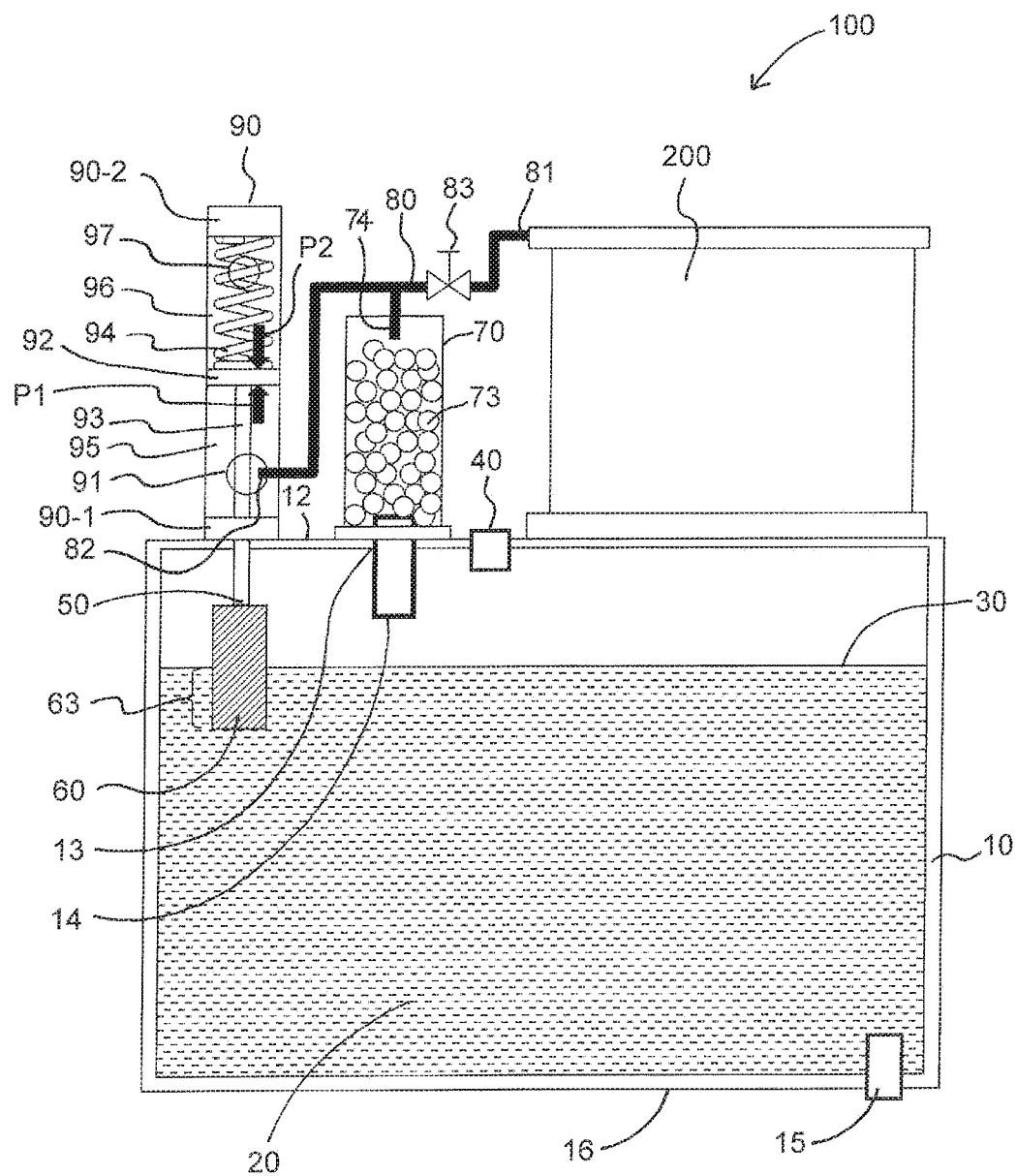

HYDROGEN GENERATOR

FIELD

This invention relates to a hydrogen generator.

CROSS-REFERENCE TO RELATED APPLICATIONS

The present application is a filing under 35 U.S.C. 371 as the National Stage of International Application No. PCT/SG2017/050138, filed Mar. 22, 2017, entitled "HYDROGEN GENERATOR," which claims priority to Singapore Application No. SG 10201602242Q filed with the Intellectual Property Office of Singapore on Mar. 22, 2016 and entitled "HYDROGEN GENERATOR," both of which are incorporated herein by reference in their entirety for all purposes.

BACKGROUND

It has been estimated that the global fuel cells market (valued by some analysts at US $355.3 million in 2011) is projected to grow to US $910.3 million by 2018, growing at a CAGR of 15.0% from 2013 to 2018. The fuel cells market is expected to grow at a compound annual growth rate of 15% during the forecast period. Among various types of fuel cells, proton exchange membrane fuel cells (PEMFCs) have the greatest potential in penetrating the market, especially in portable applications. The commonly used fuel for PEMFCs is hydrogen where it reacts with oxygen to produce electricity, heat and water. PEMFCs are viewed as leading the overall fuel cells market in terms of revenue, and estimated to be growing at a CAGR of 11.5% from 2013 to 2018 and accounting for 46.3% of the total demand in 2011 in terms of power volume (MW).

Hydrogen can also be used in a diesel engine system with no or little modifications to the engine. Hydrogen can be introduced into the engine either by carburation, manifold/port injection or in-cylinder injection. The literature on diesel pilot-ignited hydrogen combustion suggest that hydrogen substitution is a promising method of reducing undesired exhaust emissions, especially at high rates of hydrogen substitution. There may be significant savings of fuel consumption as well.

It can thus be seen that hydrogen is an important fuel source and its generation and delivery to hydrogen-consuming devices is critical to the successful use of such devices.

Metal borohydrides have been developed as viable hydrogen carriers (U.S. Pat. Nos. 2,461,662, 2,461,663, 2,534,553 and 2,964,378). During the 1990s, sodium borohydride attracted a tremendous amount of attention due to its chemical properties including non-flammability of sodium borohydride solutions, high hydrogen density (HD, 10.8 wt. %) and the high stability of its environmentally safe reaction by-products. U.S. Pat. No. 6,534,033 describes a hydrogen generation system wherein the hydrolysis of sodium borohydride has been successfully demonstrated. However, hydrogen generation using this system does not appear to be suitable for heavy-duty applications due to issues relating to the handling of water, catalyst reactivity/deactivation and the treatment of by-products. These issues have been further discussed in the published article: J. H. Wee, K. Y. Lee, and S. H. Kim, Sodium borohydride as the hydrogen supplier for proton exchange membrane fuel cell systems, Fuel Processing Technology, 87 (2006) 811-819.

Another hydrogen generation reactor for portable fuel cell system is described in U.S. Pat. No. 7,105,033. In this reactor, alkaline stabilized sodium borohydride solution is injected into a fixed bed reactor filled with a catalyst, to cause high-speed generation of hydrogen gas from the reaction $NaBH_4+(2+n)H_2O=NaBO_2.nH_2O+4H_2$. Despite its several advantages, such as, relatively controllable start and stop of hydrogen generation, this method still suffers from many deficiencies, in particular, a low hydrogen production density, non-constant hydrogen flow rate, short life span of catalyst, low solubility of by-products (sodium borate). Furthermore, the catalysts used are typically noble metals (Pt, Pd, etc.), adding to the cost pressures of running such systems. The cost of operating the system can be significantly lowered if robust self-support cobalt oxide-based catalyst is used as an alternative catalyst to accelerate the hydrolysis reaction of sodium borohydride (see US 20150017084 A1).

Nevertheless, there still remains a need to develop a viable hydrogen generator that can be cost effectively coupled with hydrogen-consuming devices to provide hydrogen as a fuel to such devices.

SUMMARY

According to a first aspect, there is provided a hydrogen generator comprising:
a container configured to contain a solution of a soluble chemical fuel that reacts with a catalyst to generate hydrogen, the container having a gas outlet to allow generated hydrogen to leave the container;
a control cylinder having a first end attached to a top of the container and comprising
a piston configured to travel axially within the control cylinder, the piston separating the control cylinder into two chambers: a first chamber defined between the piston and the first end of the control cylinder, and a second chamber defined between the piston and a second end of the control cylinder,
a pole attached to the piston and extending into the container,
a catalyst holder provided within the container and connected to the pole, the catalyst holder configured to secure a solid piece of the catalyst that reacts with the soluble chemical fuel to generate hydrogen,
resilient means biasing the catalyst holder towards a bottom of the container, and
a gas inlet port configured to allow hydrogen into the first chamber;
a gas flow line in fluid communication with the gas outlet of the container, the gas flow line having
a first end in fluid communication with the gas inlet port of the control cylinder,
a second end configured to feed hydrogen generated in the container to a hydrogen-consuming device, and
a two-way valve provided to allow fluid communication between the first end and the second end of the gas flow line to be selectably established or cut off,
wherein in use, a free end of the solid piece of the catalyst secured to the catalyst holder is immersed in the solution in the container, wherein rate of hydrogen generation in the container is determined by a depth of submergence of the catalyst in the solution, and wherein the depth of submergence is determined by demand for hydrogen by the hydrogen-consuming device.

The hydrogen generator may further comprise a drying channel provided between the gas outlet of the container and the gas flow line, the drying channel containing a drying agent therein.

A first end of the drying channel may be connected to the gas outlet of the container.

Hydrogen in the first chamber may exert a first pressure on the piston, the first pressure determined by the amount of hydrogen in the first chamber, and the resilient means may exert a second pressure on the piston thereby biasing the piston towards the first end of the control cylinder.

The depth of submergence of the catalyst in the solution may be determined by a difference between the first pressure and the second pressure.

The amount of hydrogen in the first chamber may be determined by the demand for hydrogen by the hydrogen-consuming device, and wherein the depth of submergence is increased when the demand for hydrogen is increased.

The gas outlet may be provided with a hydrophobic filter membrane.

The catalyst holder may be integral with the pole.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawing.

FIG. 1 is a schematic illustration of an exemplary hydrogen generator in connection with a hydrogen-consuming device.

DETAILED DESCRIPTION

An exemplary embodiment of the hydrogen generator 100 will be described below with reference to FIG. 1.

The hydrogen generator 100 comprises an enclosed container 10 in which a fuel solution 20 of any soluble chemical fuel that reacts to produce hydrogen gas (such as alkaline stabilized $NaBH_4$ solution) may be stored, the solution 20 having a certain liquid level 30 in the container. The solution 20 may be fed into the container via a feed port 40 provided at a top 12 of the container 10. The feed port 40 (e.g. its lid) can be further configured to relieve gas from the container to function also as a release valve to relieve pressure in the container 10 when necessary, for example when pressure in the container is higher than a predetermined set point. A solution discharge port 15 is preferably provided at a bottom 16 of the container 10.

The hydrogen generator 100 also comprises a catalyst holder 50 provided in the container 10. The catalyst holder 50 is configured to secure a piece of solid catalyst 60 thereto. For example, the catalyst 60 may be inserted into a cavity provided in the catalyst holder 50, or the catalyst 60 may be provided with a cavity into which the catalyst holder 50 is inserted. The catalyst 60 preferably comprises a cobalt oxide-based composite. Alternatively, the catalyst may be any other catalyst that can accelerate the hydrolysis reaction of the chemical fuel 20 to generate hydrogen. The catalyst 60 may be provided in any suitable solid form, such as a tube, a stick, a slice or disc, a block and so on. When the hydrogen generator 100 is in use, a free end of the catalyst 60 is immersed in the solution 20 to a depth of submergence 63.

As a result of contact of the catalyst 60 with the $NaBH_4$ solution 20, hydrogen is generated. The rate of hydrogen generation is directly proportional to the depth of submergence 63 of the catalyst 60 in the solution 20 as more of the catalyst 60 is in contact with the solution 20 under the liquid level 30. The container 10 is provided with a gas outlet 13 for the generated hydrogen above the liquid level 30. A hydrophobic filter membrane 14 is provided at the gas outlet 13. The membrane 14 is preferably also configured to purify the gas generated from the fuel solution 20, reduce water loss, and block by-products and other inorganic molecules from passing through.

The gas outlet 13 preferably opens into a drying channel 70 that is filled with a drying agent 73, for example color-changing silica gel, so that the generated hydrogen is dried before being fed to the hydrogen-consuming device 200. A first end of the drying channel 70 may be attached to the container 10 around the gas outlet 13. The gas outlet 13 (via the channel 70) is in fluid connection with a gas flow line 80. This may be via a generated hydrogen pipe 74 that preferably extends from a second end of the channel 70 into the gas flow line 80. The gas flow line 80 comprises a first end 81 for supplying the generated hydrogen to a hydrogen-consuming device 200 (such as a fuel cell, a diesel engine) and a second end 82 that is fluid communication with a control cylinder 90 of the hydrogen generator 100 via a gas inlet port 91 of the control cylinder 90. The gas flow line 80 is provided with a two-way valve 83 that, when open, establishes a fluid connection between the first end 81 and second end 82 of the gas flow line 80. In this way, upon turning on the two-way valve 83, the generated hydrogen filtered by the hydrophobic filter membrane 14 (as it flows through the gas outlet 13) and dried by the drying agent 73 (as it flows through the channel 70) will flow to the device 200 and to the gas inlet port 91 of the control cylinder 90, via the generated hydrogen pipe 74 and the gas flow line 80.

A first end 90-1 of the control cylinder 90 is attached to the top 12 of the container 10. The control cylinder 90 further comprises a piston 92 configured to travel axially within the control cylinder 90. The piston 92 may take the form of a simple disc having a running fit within the cylinder 90 to minimize hydrogen gas from passing between the piston 92 and the control cylinder 90. The piston 92 separates the control cylinder 90 into two chambers: a first chamber 95 defined between the piston 92 and the first end 90-1 of the control cylinder 90, and a second chamber 96 defined between the piston 92 and a second end 90-2 of the control cylinder 90.

A pole 93 is attached to the piston 92 and extends into the container 20 to be connected to the catalyst holder 50 in the container 10. In one embodiment, the pole 93 and catalyst holder 50 are integrally formed as a single monolithic structure. The gas inlet port 91 of the cylinder 90 is configured to allow gas to flow into the first chamber 95. Gas in the first chamber 95 exerts a first pressure P1 on the piston 92.

Resilient means 94 are provided that bias the catalyst holder 50 towards the bottom 16 of the container 10. For example, the resilient means 94 may comprise a compression spring 94 provided in the second chamber 96 and exerting a second pressure P2 on the piston 92 so as to bias the piston 92 towards the first end 90-1 of the control cylinder 90, i.e., towards the container 10. When the piston 92 moves towards the container 10, the catalyst holder 50 connected to the pole 93 that is attached to the piston 92 accordingly moves towards the bottom 16 of the container 10. The catalyst 60 secured to the catalyst holder 50 thus has a greater depth of submergence 63 in the solution 20 when the piston 92 moves towards the container 10.

An air release vent 97 is preferably provided adjacent the second end 90-2 of the control cylinder 90 to adjust the amount of air in the second chamber 96. The hydrogen generation rate will be controlled by a demand-regulated balancing of the pressure P2 exerted by the innerspring or compression spring 94 and the gas pressure P1 in the reactor or container 10, as will be described below.

When P1>P2, the catalyst 60 will be pulled out of the fuel solution 20 as a result of the greater gas pressure P1 pushing the piston 92 upwards, thereby drawing up the pole 93 together with the catalyst holder 50 and the catalyst 60. When this occurs, the rate of hydrogen generation will decrease as the depth of submergence 63 is decreased so that less of the catalyst 60 is in contact with the solution 20.

When P1=P2, the catalyst 60 tube/stick won't be moved as the piston 92 remains stationary and the rate of generated hydrogen will be constant.

When P1<P2, the catalyst 50 holder will be pushed downward to be more immersed into the fuel solution 20 as the greater pressure P2 exerted by the compression spring 94 pushes the piston 92 downwards, thereby pushing down the pole 93 together with the catalyst holder 50 and the catalyst 60. When this occurs, the rate of hydrogen generation will be accelerated as the depth of submergence 63 is increased so that more of the catalyst 60 is in contact with the solution 20 to generate more hydrogen.

Thus, the hydrogen generation rate in the hydrogen generator 100 is automatically controlled by the resilient means 94 that adjusts the depth of submergence of the self-supported (e.g. cobalt oxide-based) catalyst 60 tube/stick in the chemical (e.g. alkaline stabilized NaBH$_4$) based on a pressure difference between the pressure P1 in the chemical containing container 10 and the pressure P2 in the control cylinder 90.

The pressure P1 in the container 10 is affected by the rate at which hydrogen is consumed by the device 200 when the two-way valve 83 is open. When hydrogen consumption is increased, the pressure P1 drops. When P1 falls below P2, as mentioned above, the depth of submergence 63 increases, resulting in greater hydrogen production to meet the hydrogen consumption needs of the device 200. Conversely, when hydrogen consumption is decreased, the pressure P1 is increased as a result of the generated hydrogen not being consumed as quickly. When P1 rises above P2, as mentioned above, the depth of submergence 63 decreases, resulting in reduced hydrogen production.

Thus, it can be seen that rate of hydrogen generation in the container 10 is determined by the depth of submergence 63 of the catalyst 60 in the solution 20, and the depth of submergence 63 is determined by demand for hydrogen by the hydrogen-consuming device 200. In this way, hydrogen generation in the hydrogen generator 100 is regulated by hydrogen demand of the hydrogen-consuming device 200 via the simple and compact control cylinder 90, reducing the size and weight of the hydrogen generator 100 while improving overall energy density. This makes the hydrogen generator 100 suitable for portable applications, although it may also be customized for any other applications that require hydrogen gas.

Whilst there has been described in the foregoing description exemplary embodiments of the present invention, it will be understood by those skilled in the technology concerned that many variations and combination in details of design, construction and/or operation may be made without departing from the present invention. For example, the drying channel may be omitted so that the generated hydrogen pipe is connected directly to the gas outlet of the container, or alternatively, the drying channel may be provided between the two-way valve and the second end of the gas flow line that feeds to the hydrogen-consuming device. While a feed port has been described as being provided to allow the solution to be fed into the container, alternatively, the entire top of the container may be provided as a removable lid so that the container may be opened to allow solution into the container and to replace the piece of solid catalyst when necessary. While the resilient means described above is a compression spring provided in the second chamber of the control cylinder, the resilient means may alternatively comprise an extension spring provided in the first chamber of the control cylinder, or a compression spring provided in the container between the top of the container and the catalyst holder.

The invention claimed is:

1. A hydrogen generator comprising:
   a container configured to contain a solution of a soluble chemical fuel that reacts with a catalyst to generate hydrogen, the container having a gas outlet to allow generated hydrogen to leave the container;
   a control cylinder having a first end attached to a top of the container and comprising
      a piston configured to travel axially within the control cylinder, the piston separating the control cylinder into two chambers: a first chamber defined between the piston and the first end of the control cylinder, and a second chamber defined between the piston and a second end of the control cylinder,
      a pole attached to the piston and extending into the container,
      a catalyst holder provided within the container and connected to the pole, the catalyst holder configured to secure a solid piece of the catalyst that reacts with the soluble chemical fuel to generate hydrogen,
      resilient means biasing the catalyst holder towards a bottom of the container, and
      a gas inlet port configured to allow hydrogen into the first chamber;
   a gas flow line in fluid communication with the gas outlet of the container, the gas flow line having
      a first end in fluid communication with the gas inlet port of the control cylinder,
      a second end configured to feed hydrogen generated in the container to a hydrogen-consuming device,
      a two-way valve provided to allow fluid communication between the first end and the second end of the gas flow line to be selectably established or cut off, and
      a drying channel provided between the gas outlet of the container and the gas flow line, the drying channel containing a drying agent therein,
   wherein in use, a free end of the solid piece of the catalyst secured to the catalyst holder is immersed in the solution in the container, wherein rate of hydrogen generation in the container is determined by a depth of submergence of the catalyst in the solution, wherein gradual variation in the depth of submergence proportionately gradually varies amount of the catalyst in contact with the solution such that more hydrogen is generated when more of the catalyst is in contact with the solution and less hydrogen is generated when less of the catalyst is in contact with the solution, and wherein the depth of submergence is determined by demand for hydrogen by the hydrogen-consuming device.

2. The hydrogen generator of claim 1, wherein a first end of the drying channel is connected to the gas outlet of the container.

3. The hydrogen generator of claim 1, wherein hydrogen in the first chamber exerts a first pressure on the piston, the first pressure determined by the amount of hydrogen in the first chamber, and wherein the resilient means exerts a second pressure on the piston thereby biasing the piston towards the first end of the control cylinder.

4. The hydrogen generator of claim 3, wherein the depth of submergence of the catalyst in the solution is determined by a difference between the first pressure and the second pressure.

5. The hydrogen generator of claim 3, wherein the amount of hydrogen in the first chamber is determined by the demand for hydrogen by the hydrogen-consuming device, and wherein the depth of submergence is increased when the demand for hydrogen is increased.

6. The hydrogen generator of claim 1, wherein the gas outlet is provided with a hydrophobic filter membrane.

7. The hydrogen generator of claim 1, wherein the catalyst holder is integral with the pole.

* * * * *